Dec. 28, 1937.  E. CASPAR  2,103,810
SILENCER FOR THE EXHAUST GASES OF INTERNAL COMBUSTION ENGINES
Filed April 15, 1936

Inventor
Eduard Caspar
By B Linger, atty.

Patented Dec. 28, 1937

2,103,810

UNITED STATES PATENT OFFICE 2,103,810

SILENCER FOR THE EXHAUST GASES OF INTERNAL COMBUSTION ENGINES

Eduard Caspar, Zurich, Switzerland

Application April 15, 1936, Serial No. 74,530
In Germany April 16, 1935

2 Claims. (Cl. 181—59)

This invention relates to a silencer for the exhaust gases of internal combustion engines, particularly adapted for motor vehicles.

The object of the present invention is to provide a silencer which not only practically completely silences the exhaust noise but which at the same time does not reduce the efficiency of the engine but increases it.

According to the present invention this object is achieved in that the exhaust gases are passed into an expansion and cooling chamber to which are so connected one or more air chambers that at least a portion of the exhaust gases can enter these. These chambers effect an equalization of pressure, the oscillations of the gas column are reduced, the gases pass free from shock and noiselessly from the silencer. These auxiliary chambers are preferably of tubular construction and are so arranged that they are comparatively strongly cooled by the air which passes over them. The size of volume of the chambers is in a predetermined relation with the volume of exhaust gases.

A preferred form of construction which has proved satisfactory is shown diagrammatically by way of example in the accompanying drawing, wherein.

Figure 1:
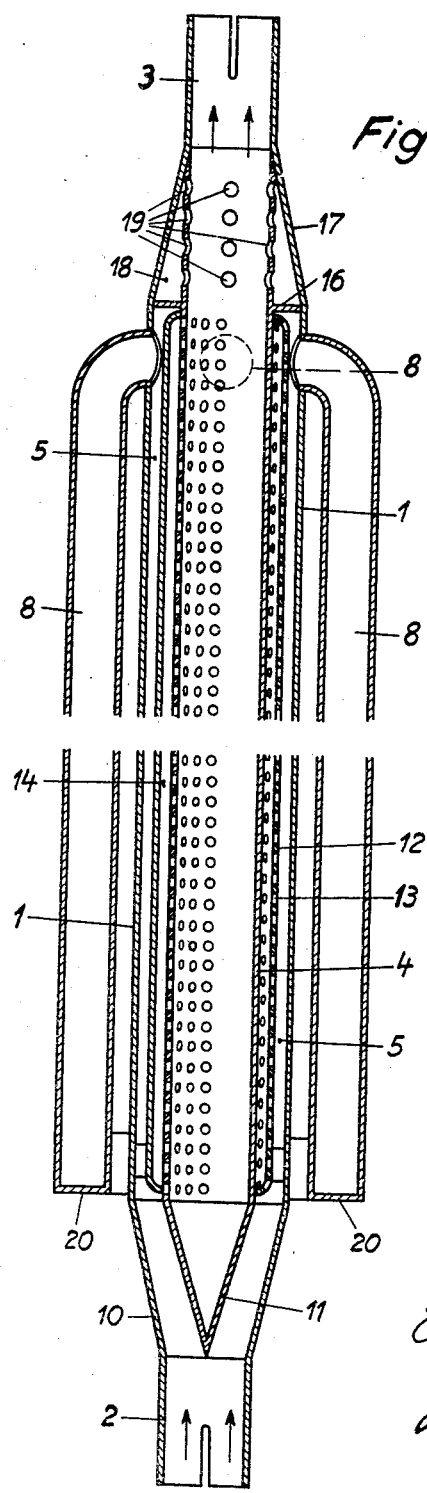
Fig. 1 is an axial section.
Figure 2:
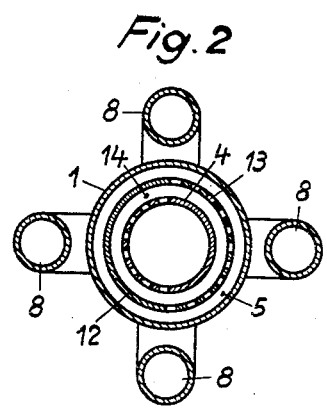
Fig. 2 is a cross section on line II—II of Fig. 1.

The silencer shown is provided with a cylindrical casing 1 of sheet metal to which a tubular member 2 adapted to be connected detachably to the exhaust pipe of the engine is connected by a conical connection 10. The casing 1 terminates in a cylindrical member 3 of which the diameter corresponds substantially with that of the member 2. Between the members 2 and 3 there extends a metal pipe 4. The pipe 4 is closed at its fore end cap 11. One half of the pipe 4 is perforated. The pipe 4 is surrounded by a pipe 12 of which half is perforated. The perforated areas of the pipes 4 and 12 are angularly displaced by 180°. The gases pass from the member 2 into the space 5, between the pipe 12 and the casing 1, and from this through the perforations 13 of pipe 12 into the space 14 between the pipes 4 and 12. The gases further pass through the perforations 15 into pipe 4 and therefrom to the member 3. The space 5 is closed by an annular ring 16. The pipe 4, said ring 16 together with the conical connecting piece 17 form a chamber 18 which communicates with the pipe 4 by perforation 19. The chamber 18 aids in muffling the sound. To the casing 1 are connected auxiliary chambers formed by pipes 8. These are connected to near the outer end space 5 of the casing 1 and are closed at their inner end 20. Any suitable number of pipes 8 may be provided. The pipes 8 are arranged at a suitable distance from the casing 1 so that air can pass over them and the casing 1 which are thus effectively cooled. The size or volume of the pipes 8 is made sufficiently large so that the air columns present in the pipes 8 have a sufficient shock and oscillation damping action. The outflowing gases carry all the impurities with them.

A feature of the invention is that the exhaust passage contains no baffles, which if present, would tend to impede the free passage of the low frequency vibrations and thereby create objectionable back pressure. Due to the absence of baffles, it is possible to construct a muffler which, in respect to the degree of its noise suppressing properties, is extremely light in weight.

What I wish to secure by U. S. Letters Patent is:

1. A silencer for exhaust gases, comprising a cylindrical casing having a main chamber to the front end of which casing the exhaust gases are admitted and from the rear end of which casing the gases are discharged; a pipe within said casing having apertures and having its forward end closed and its rearward end communicating with the rear end of said casing; said casing having a secondary chamber near its rear end communicating only with the interior of said pipe through apertures in said pipe adjacent thereto; and at least one pipe located outside said casing and spaced therefrom, one end of said last named pipe being closed and the other end being in communication with the interior of said casing adjacent but to the rear of said secondary chamber, a partition in said casing dividing said secondary chamber from the main chamber.

2. A silencer for exhaust gases, comprising a cylindrical casing having a main chamber to the front end of which casing the exhaust gases are admitted and from the rear end of which casing the gases are discharged; a pipe within said casing having apertures and having its forward end closed and its rearward end communicating with the rear end of said casing; said casing having a secondary chamber near its rear end communicating only with the interior of said pipe through apertures in said pipe adjacent thereto; and at least one pipe located outside said casing and spaced therefrom, one end of said last named pipe being closed and the other end being in communication with the interior of said casing adjacent but to the rear of said secondary chamber, a partition in said casing dividing said secondary chamber from the main chamber; a shell having one end closed and embracing said first mentioned pipe within the main chamber of said casing and spaced from said first mentioned pipe and from said casing and having a part of its wall perforated, in virtue of all of which the exhaust gases will pass into the front end of said casing, thence through the perforations of said shell into the same and from thence through perforations in said first mentioned pipe into said first mentioned pipe and be discharged to the atmosphere, the gases in said secondary chamber serving as a pneumatic cushion to deaden sound.

EDUARD CASPAR.